United States Patent [19]

Lew

[11] Patent Number: 5,101,668
[45] Date of Patent: Apr. 7, 1992

[54] TORSIONAL VORTEX SENSOR

[76] Inventor: Hyok S. Lew, 7890 Oak St., Arvada, Colo. 80005

[21] Appl. No.: 636,681

[22] Filed: Dec. 31, 1990

[51] Int. Cl.⁵ .............................................. G01F 1/32
[52] U.S. Cl. .................................................. 73/861.24
[58] Field of Search ......................... 73/861.22, 861.24

[56] References Cited

U.S. PATENT DOCUMENTS 4,181,020 1/1980 Herzl ................................. 73/861.24
4,380,935 4/1983 Sgourakes ........................ 73/861.24

Primary Examiner—Herbert Goldstein

[57] ABSTRACT

A vortex sensor comprises a pressure sensing planar member disposed within a flow passage parallel to a vortex generating bluff body and the central axis of the flow passage and supported by a supporting body in an arrangement allowing at least a minute amount of pivoting movement of the pressure sensing planar member about a torsion axis disposed parallel to the pressure sensing planar member and perpendicular to the central axis of the flow passage adjacent to one of the leading and trailing edges of the pressure sensing planar member, and a lateral extension extending from the pressure sensing planar member in a direction perpendicular to the torsion axis and to the central axis of the flow passage and connected to a transducer at an extremity thereof, whereby the transducer converts an alternating torque about the torsion axis exerted on the pressure sensing planar member by the vortices in the fluid stream to an alternating electrical signal, wherein the pressure sensing planar member is disposed downstream of the vortex generating bluff body or within a planar cavity included in the vortex generating bluff body.

20 Claims, 2 Drawing Sheets

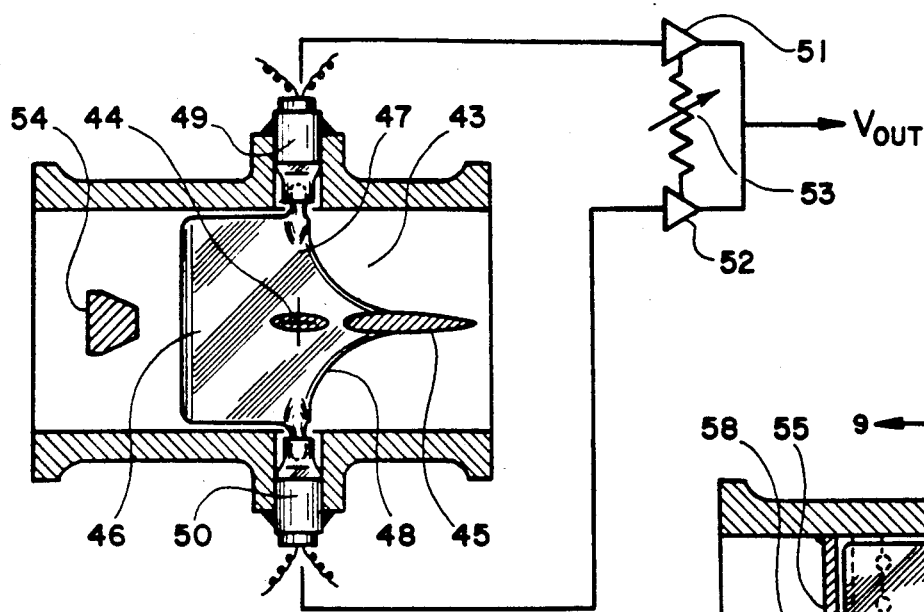
Fig. 7
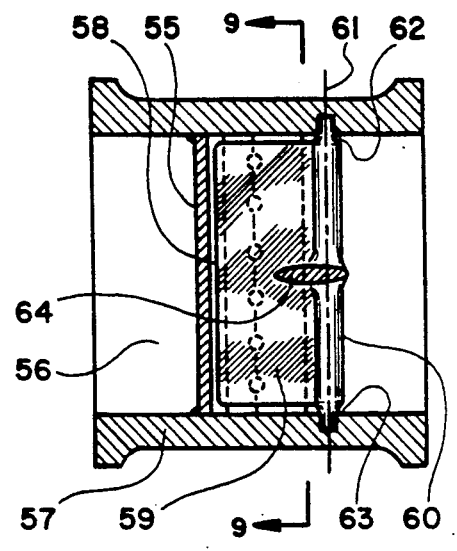
Fig. 8
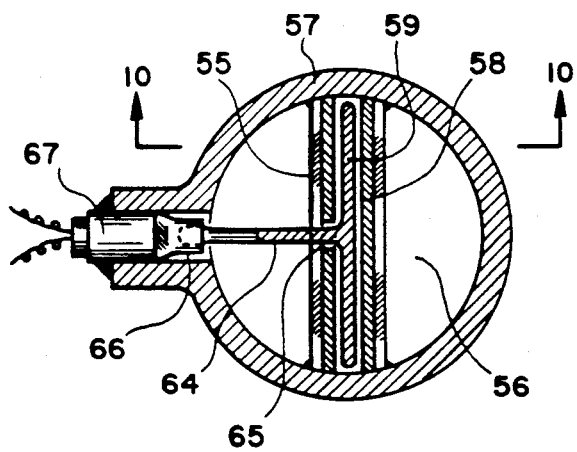
Fig. 9
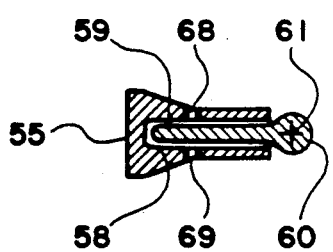
Fig. 10
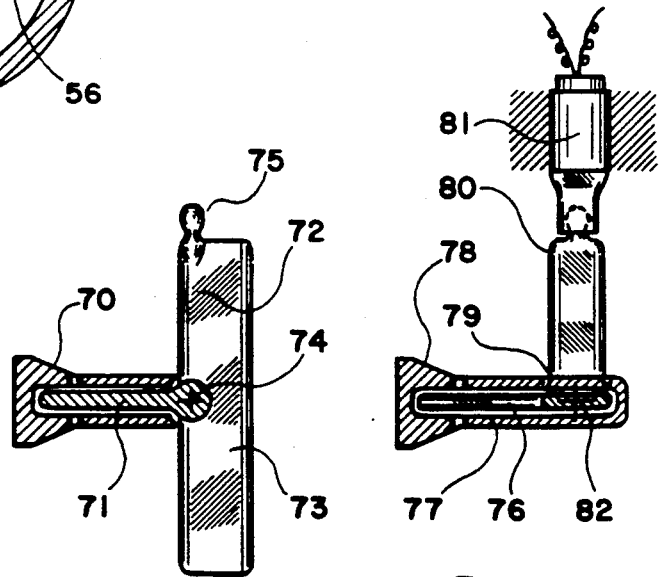
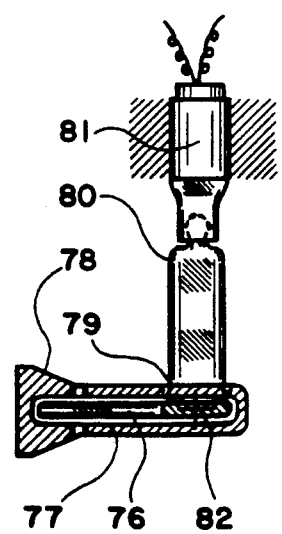
Fig. 11
Fig. 12

TORSIONAL VORTEX SENSOR

BACKGROUND OF THE INVENTION

While state of the art versions of the vortex shedding flowmeter operate in a range with turn-down ratio (ratio of the maximum to the minimum measurable fluid velocity) approaching 100 to 1 and are capable of measuring the air flow under standard condition as low as a few feet per second and the water flow as low as a fraction of a foot persecond, most of the existing versions of the vortex shedding flowmeter operate in a range with turn-down ratio equal to 15-20 to 1 at most and are incapable of measuring the air flow under standard condition lower than 15 feet per second and the water flow lower than 2 feet per second. The present invention teaches a vortex shedding flowmeter having a very simple construction and capable of operating in a range with turn-down ratio approaching 100.

BRIEF SUMMARY OF THE INVENTION

The primary object of the present invention is to provide a vortex shedding flowmeter comprising a vortex generating bluff body disposed across a flow passage and a vortex sensing planar member disposed downstream of the vortex generating bluff body on a plane parallel to the longitudinal axis of the bluff body as well as to the central axis of the flow passage, wherein the vortex sensing planar member is supported by the wall of the flow passage in an arrangement allowing at least a minute amount of pivoting movement of the vortex sensing planar member about a torsion axis located near one of the leading and trailing edges of the vortex sensing planar member in a parallel relationship to the longitudinal axis of the bluff body, and the vortex sensing planar member has a lateral extension extending therefrom in a direction generally perpendicular to the vortex sensing planar member and connected to a transducer at the extremity thereof.

Another object is to provide the vortex shedding flowmeter described in the primary object of the present invention wherein the vortex sensing planar member has a balanced mass distribution or a balanced moment of inertia distribution about the torsion axis.

A further object of the present invention is to provide a vortex shedding flowmeter comprising a vortex generating bluff body disposed across a flow passage and a vortex sensing planar member disposed in a planar cavity included in the vortex generating bluff body and supported by the bluff body or flowmeter body in an arrangement allowing at least a minute amount of pivoting movement of the vortex sensing planar member about a torsion axis located near one of the leading and trailing edges of the vortex sensing planar member in a parallel relationship to the longitudinal axis of the bluff body, wherein the vortex sensing planar member has a lateral extension extending therefrom and through an opening included in a wall of the planar cavity in a direction generally perpendicular to the vortex sensing planar member and connected to a transducer at the extremity thereof.

Yet another object is to provide the vortex shedding flowmeter described in the above-presented further object of the present invention, wherein the vortex sensing planar member has a balanced mass distribution or a balanced moment of inertia distribution about the torsion axis.

These and other objects of the present invention will become clear as the description of the present invention progresses.

BRIEF DESCRIPTION OF THE FIGURES

The present invention may be described with a greater clarity and specificity by referring to the following figures:

FIG. 7 illustrates a cross section of an embodiment of the vortex shedding flowmeter employing a torsional vortex sensor similar to the embodiment shown in FIG. 6.

FIG. 8 illustrates a cross section of an embodiment of the vortex shedding flowmeter including a torsional vortex sensor of the present invention disposed within a planar cavity included in the vortex generating bluff body.

FIG. 9 illustrates another cross section of the vortex shedding flowmeter shown in FIG. 8.

FIG. 10 illustrates a cross section of the vortex generator-sensor included in the vortex shedding flowmeter shown in FIGS. 8 and 9.

FIG. 11 illustrates a cross section of another embodiment of the vortex generator-sensor that has a balanced mass distribution or a balanced moment of inertia distribution about the torsion axis of the torsional vortex sensor.

FIG. 12 illustrates a cross section of a further embodiment of the vortex generator-sensor.

DESCRIPTION OF THE ILLUSTRATED EMBODIMENTS

Figure 1:
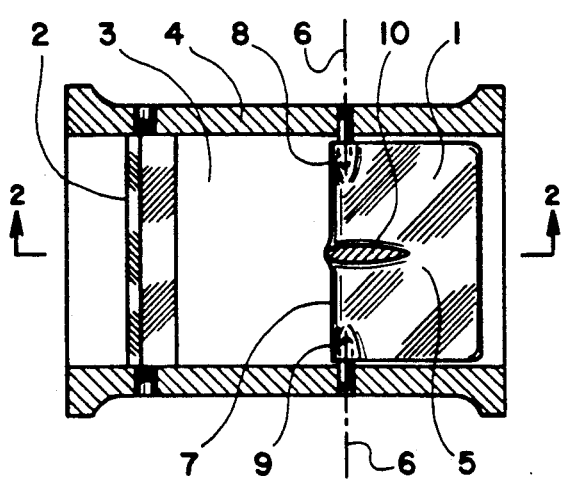
FIG. 1 illustrates a cross section of an embodiment of the vortex shedding flowmeter including a torsional vortex sensor of the present invention disposed downstream of the vortex generating bluff body.

In FIG. 1 there is illustrated a cross section of an embodiment of the vortex shedding flowmeter that employs the torsional vortex sensor 1 of the present invention disposed downstream of the vortex generating bluff body 2 of an elongated cylindrical shape disposed across the flow passage 3 extending through the flowmeter body 4. The torsional vortex sensor 1 comprises a planar member 5 disposed downstream of the bluff body 2 on a plane generally parallel to the longitudinal axis of the bluff body 2 and the central axis of the flow passage and supported by the flowmeter body 4 in an arrangement allowing at least a minute amount of pivoting movement of the pressure sensing planar member 5 about a torsion axis 6 located near one of the leading and trailing edges of the planar member 5 in a parallel relationship to the longitudinal axis of the bluff body 2. In the particular illustrative embodiment shown, the torsion axis 6 is located near the leading edge 7 of the pressure sensing planar member 5 that is pivotably supported by a pair of journal bearings 8 and 9. The pressure sensing planar member 5 includes a lateral planar extension 10 extending from the leading edge portion of the midsection thereof in a direction perpendicular to the torsion axis 6 as well as to the central axis of the flow passage 3, which lateral planar extension 10 is connected to a transducer at the extremity thereof as shown in FIG. 2.

Figure 2:
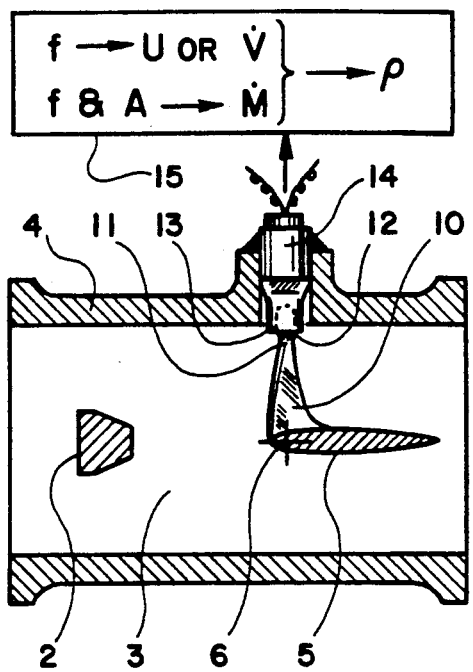
FIG. 2 illustrates another cross section of the vortex shedding flowmeter shown in FIG. 1.

In FIG. 2 there is illustrated another cross section of the vortex shedding flowmeter shown in FIG. 2, which cross section is taken along plane 2—2 as shown in FIG. 1. The extremity 11 of the lateral planar extension 10 is connected by a mechanical coupling 12 to the force receiving member 13 extending from the transducer container vessel 14 anchored to the flowmeter body 4. It should be noticed that the central axis of the force receiving member 13 and the torsion axis 6 are disposed on a common cross section of the flow passage. The vortex generating bluff body 2 sheds a series of vortices from the two opposite sides thereof in an alternating mode, which vortices create sinuating streamlines exerting an alternating lift force on the pressure sensing planar member 5 and produce an alternating torque about the torsion axis experienced by the pressure sensing planar member 5. The lateral planar extension 10 converts the alternating torque about the torsion axis 6 to an alternating lateral force acting in a direction parallel to the central axis of the flow passage 3, that is transmitted to the force receiving member 13. The transducer assembly 14 detects only the alternating lateral forces acting in the direction parallel to the central axis of the flow passage, and consequently the noise generated by the flexural vibrations of the pipe line is automatically rejected, which charateristic makes the vortex flowmeter shown in FIGS. 1 and 2 highly sensitive to the vortex-generated signal and immune to noise. The transducer contained within the transducer container vessel 14 converts the alternating lateral force transmitted to the force receiving member 13 to an alternating electrical signal representing the vortex shedding from the bluff body 2. The alternating electrical signal generated by the alternating torque produced by the sinuating streamlines associated with the vortices and experienced by the planar member 5 has a frequency which is the same as that of the vortex shedding from the bluff body, which is proportional to the fluid velocity, and an amplitude that is a function of the dynamic pressure of the fluid, which is equal to one half of the fluid density times the square of the fluid velocity. As a consequence, the fluid velocity U or the volume flow rate $\dot{V}$ of the fluid is determined as a function of the frequency f of the alternating electrical signal, while the mass flow rate $\dot{M}$ of the fluid is determined as a function of the frequency f and the amplitude A of the alternating electrical signal, wherein the mathematical relationship defining the functions respectively determining the volume and mass flow rate are obtained by an empirical method. Of course, the density of the fluid $\rho$ can be determined as the ratio of the mass flow rate to the volume flow rate. The algorithms determining the volume flow rate, mass flow rate, or the density of the fluid is performed by a data processor 15 receiving the input data f and A of the alternating electrical signal generated by the transducer included in the vortex sensor.

Figure 3:
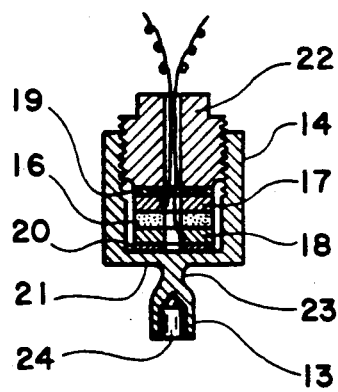
FIG. 3 illustrates a cross section of an embodiment of the transducer converting alternating torque experienced by the torsional vortex sensor to an alternating electrical signal.

In FIG. 3 there is illustrated a cross section of the transducer assembly 14 included in the vortex flowmeter shown in FIG. 2, which cross section is taken along a cross section of the flow passage 3 including the longitudinal axis of the force receiving member 13 and the torsional axis 6. The transducer container vessel 14 houses a piezo electric disc element 16 sandwiched between a pair of electrode discs 17 and 18, and a pair of insulator discs 19 and 20, which combination of the discs are pressed onto a deflective end wall 21 of the container vessel 14 by a threaded plug 22 plugging the open end of the container vessel. The deflective end wall 21 of the container vessel 14 has a reinforcing rib 23 extending diametrically thereacross, from which rib 23 the force receiving member 13 extends. The mechanical coupling means 24 connecting the extremity of the lateral planar extension 10 to the force receiving member 13 as shown in FIG. 2 may be a socket type joint, threaded joint, pressure fitted joint or welded joint.

Figure 4:
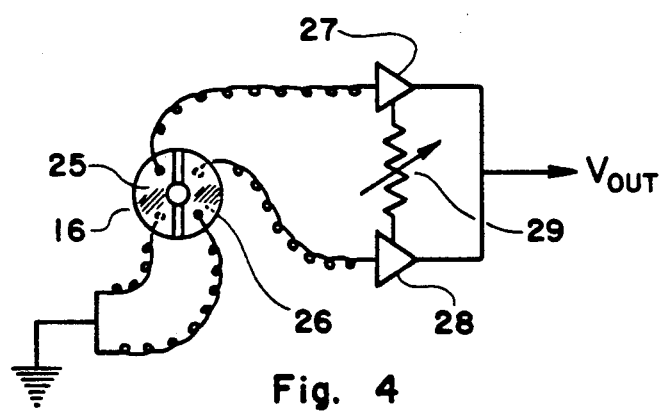
FIG. 4 illustrates a plan view of an embodiment of the piezo electric element included in the transducer shown in FIG. 3, and an embodiment of the electric circuit conditioning the signal generated by the transducer.

In FIG. 4 there is illustrated a plan view of an embodiment of the piezo electric disc element 16 included in the transducer assembly shown in FIG. 3 and an electric circuit conditioning the alternating electrical signal generated by the piezo electric disc element. Each side of the piezo electric disc element 16 includes a pair of semicircular electrodes 25 and 26 respectively disposed on the two opposite sides of a reference plane including the reinforcing rib 23 shown in FIG. 3, which reference plane is generally parallel to the central axis of the flow passage and perpendicular to the torsion axis 6. One electrode of one side of the piezo electric disc element 16 disposed on one side of the reference plane, and one electrode of the other side of the piezo electric element 16 disposed on the other side of the reference plane opposite to said one side are respectively connected to a pair of amplifiers 27 and 28 with a signal balancing means 29 therebetween. The other electrodes not connected to the amplifiers 27 and 28 are grounded. The signal balancing means 29 is set in such a way that noise generated by the mechanical vibrations of the torsional vortex sensor is cancelled between the two amplifiers 27 and 29, whereby the sum $V_{OUT}$ of the outputs from the two amplifiers represents the vortex shedding from the bluff body. In an alternative embodiment, the two electrodes disposed on the same side of the piezo electric element may be connected respectively to an inverting and a noninverting amplifier with a signal balancing means, which arrangement accomplishes the same object as that shown in FIG. 4. It should be understood that other types of the transducer such as the capacitive, inductive, strain gauge or fiber optic transducer may be employed in place of the piezo electric transducer shown and described.

Figure 5:
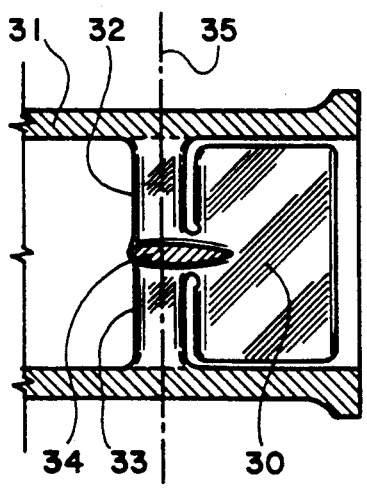
FIG. 5 illustrates another embodiment of the torsional vortex sensor of the present invention disposed downstream of the vortex generating bluff body that is not shown.

In FIG. 5 there is illustrated another embodiment of the torsional vortex sensor having essentially the same construction as the element 1 included in the embodiment shown in FIG. 1 with one exception. In this modified embodiment, the pressure sensing planar member 30 is supported by the flowmeter body 31 by means of a pair of planar support members 32 and 33 respectively extending from the two opposite sides of the lateral planar extension 34 in two opposite directions in a coaxial relationship to the torsion axis 35 and rigidly anchored to the wall of the flow passage at the extremities thereof. The slender cross section of the pair of planar support member 32 and 33 disposed parallel to the direction of the fluid flow allows a minute amount of torsional movement of the planar support members 32 and 33 about the torsion axis 35, while they support the combination of the planar member 30 and the lateral planar extension 34 against lateral displacements. It is noticed that only a midsection of the planar member 30 is joined to the combination of the two planar support members, which joining is reinforced by the lateral planar extension 34 having the root extending from the planar support members 32 and 33 to the pressure sensing planar member 30. Of course, the extremity of the lateral planar extension 34 is connected to the force receiving member of a transducer as shown in FIG. 2.

Figure 6:
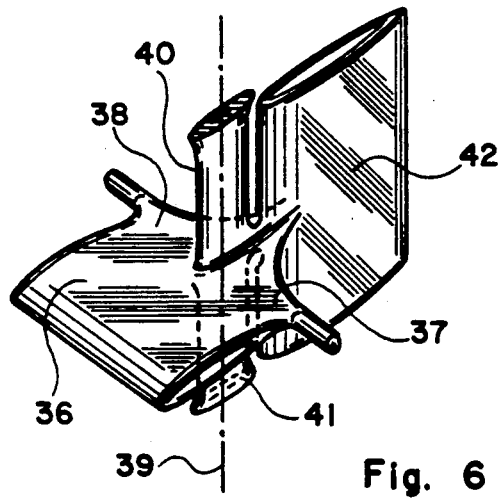
FIG. 6 illustrates a perspective view of a further embodiment of the torsional vortex sensor disposed downstream of the vortex generating bluff body that is not shown.

In FIG. 6 there is illustrated a perspective view of a further embodiment of the torsional vortex sensor that has essentially the same construction as that of the torsional vortex sensor shown in FIG. 5 with one exception, that is the counter balancing planar member 36 merged with the pair of lateral planar extensions 37 and 38, which combination is disposed on a plane perpendicular to the torsion axis 39 and joined to the midsection of the combination of the two planar support members 40 and 41, and the pressure sensing planar member 42. Both of the planar extensions 37 and 38 may be connected to a pair of transducers as shown in FIG. 7, or only one of the two lateral planar extensions may be connected to a transducer, wherein the mechanical coupling means included in the extremity of one of the two lateral planar extensions 37 and 38 can be omitted. The torsional vortex sensor shown in FIG. 6 has a balanced mass distribution or balanced moment of inertia distribution about the torsion axis 39 and consequently, inertia force associated with the mechanical vibrations of the flowmeter body does not produce any torque about the torsion axis 39, while the fluctuating fluid pressure associated with the vortices produces an alternating torque about the torsion axis 39, which characteristics make the torsional vortex sensor shown in FIG. 6 immune to to the noise generated by mechanical vibrations and selectively sensitive to the vortex-generated signal.

In FIG. 7 there is illustrated a cross section of an embodiment of the vortex shedding flowmeter employing a torsional vortex sensor similar to that shown in FIG. 6. As described in conjunction with FIG. 6, the torsional vortex sensor 43 is balanced about the torsion axis 44 as the pressure sensing planar member 45 and the counter balancing planar flow guide 46 balance one another about the torsion axis 44, and the two lateral planar extensions 47 and 48 disposed in a symmetric arrangement about a plane including the pressure sensing planar member 45 also balance one another. A pair of transducers 49 and 50 respectively connected to the extremities of the two lateral planar extensions 47 and 48 are connected to a pair of amplifiers 51 and 52 having a signal balancing means 53 therebetween. The alternating electrical signals generated by the two transducers 49 and 50 are combined in such a way that the noise generated by the mechanical vibrations of the flowmeter body is cancelled between the two amplifiers 51 and 52 by means of the signal balancing means 53 and a resultant signal $V_{OUT}$ representing the vortex shedding from the bluff body 54 is obtained. In a simpler version of the vortex flowmeter shown in FIG. 7, one of the two transducers and the combination of the two amplifiers and the signal balancing means can be omitted.

In FIG. 8 there is illustrated a cross section of an embodiment of the vortex shedding flowmeter employing a vortex generator-sensor that has a torsional vortex sensor of the present invention. A vortex generating bluff body 55 is disposed across the flow passage 56 and secured to the flowmeter body 57 at the two extremities thereof, which bluff body 55 includes a planar cavity 58 disposed on a plane parallel to the longitudinal axis of the bluff body 55 as well as to the central axis of the flow passage, which planar cavity extends to and breaks through the trailing edge of the bluff body 55. A pressure sensing planar member 59 extending from and supported by a pivotable elongated support member 60 is disposed within the planar cavity 58 with a spacing between the walls of the planar cavity 58 and the pressure sensing planar member 59. The elongated support member 60 is disposed across a cross section of the flow passage 56 adjacent to the trailing the bluff body and supported by the flowmeter body 57 in an arrangement that allows at least a minute amount of rotating movement thereof about a torsion axis 61 disposed parallel to the longitudinal axis of the bluff body 55, which arrangement may include a pair of journal bearings 62 and 63 as exemplified by the particular illustrative embodiment shown in FIG. 8, or a torsionally elastic support as shown and described in conjunction with FIG. 5. The combination of the pressure sensing planar member 59 and the elongated support member 60 includes a planar lateral extension 64 extending laterally from the midsection thereof and through a cutout included in one side wall of the planar cavity 58 and connected to a transducer at the extremity thereof as shown in FIG. 9.

In FIG. 9 there is illustrated another cross section of the vortex shedding flowmeter taken along plane 9—9 as shown in FIG. 8. The lateral planar extension 64 extending from the midsection of the pressure sensing planar member 59 and through a cutout 65 included in one side wall of the planar cavity 58 is connected to the force receiving member 66 of a transducer 67 anchored to the flowmeter body 57. It is preferred to dispose the central axis of the force receiving member 66 and the torsion axis 61 on a common cross section of the flow passage.

In FIG. 10 there is illustrated a cross section of the vortex generator-sensor comprising the vortex generating bluff body 55 and the pressure sensing planar member 59, which cross section is taken along plane 10—10 as shown in FIG. 9. The two opposite side walls of the planar cavity 58 respectively include the openings 68 and 69, each of which openings may comprise a single slitted opening or a plurality of holes disposed along a line parallel to the leading edge of the bluff body 55. The trailing edge side opening of the planar cavity 58 may be fully or partially closed by the elongated support member 60 disposed therealong. The alternatively fluctuating fluid pressure existing at the two opposite side surfaces of the bluff body 55 produces an alternating torque about the torsion axis 61, that is converted to an alternating electrical signal by the transducer 67 included in the embodiment shown in FIG. 1.

In FIG. 11 there is illustrated a cross section of another embodiment of the vortex generator-sensor comprising a bluff body 70 and the torsional vortex sensor 71 assembled into essentially the same construction as that shown in FIG. 10 with one exception. The lateral planar extension 72 included in this modified embodiment has an extended planar trailing edge 73 forming a planar flow guide perpendicular to the torsion axis 74 that counter-balances the planar member 71 whereby the overall construction of the torsional vortex sensor pivotable about the torsion axis 74 is balanced about the torsion axis 74. The lateral planar extension 72 may include a single mechanical coupling means 75 for connecting to a transducer, or may include a pair of mechanical coupling means respectively included at the two opposite extremities thereof for coupling to a pair of transducers in an arrangement similar to that shown in FIG. 7.

In FIG. 12 there is illustrated a cross section of a further embodiment of the vortex generator-sensor having a construction similar to that of the embodiment shown in FIG. 10. The pressure sensing planar member 76 is disposed within a planar cavity 77 included in the bluff body 78, wherein the planar cavity 77 has completely closed walls except for the cutout 79 accomodating the lateral planar extension 80 connected to the transducer 81 at the extremity thereof. The pressure sensing planar member is supported in a torsionally elastic arrangement about the torsion axis 82 as described in conjunction with FIG. 5.

While the principles of the present invention have now been made clear by the illustrative embodiments, there will be many modifications of the structures, arrangements, proportions, elements and materials, which are obvious to those skilled in the art and particularly adapted to the specific working environments and operating conditions in the practice of the invention without departing from those principles. It is not desired to limit the invention to the particular illustrative embodiments shown and described and, accordingly, all suitable modifications and equivalents may be regarded as falling within the scope of the invention as defined by the claims which follow.

The embodiments of the invention, in which an exclusive property or priviledge is claimed, are defined as follows:

1. An apparatus for detecting vortices comprising in combination:
   a) a pressure sensing planar member disposed within a flow passage on a plane generally parallel to the direction of fluid flow moving through the flow passage and supported by a supporting body in an arrangement allowing at least a minute amount of pivoting movement of the pressure sensing planar member about a torsion axis disposed generally perperpendicular to the direction of fluid flow and generally parallel to the pressure sensing planar member in an off-set arrangement from a center line of the pressure sensing planar member perpendicular to the direction of fluid flow;
   b) a lateral extension extending from the pressure sensing planar member in a direction generally perpendicular to the torsion axis and to the direction of fluid flow; and
   c) a transducer connected to an extremity of the lateral extension for converting an alternating lateral deflection of the extremity of the lateral extension occuring in directions generally parallel to the direction of fluid flow to a fluctuating electrical signal;
wherein fluid pressures at the two opposite side surfaces of the pressure sensing planar member fluctuating in an alternating mode exert an alternating torque about the torsion axis on the pressure sensing planar member and produce said alternating deflection of the extremity of the lateral extension that generates the fluctuating electrical signal from the transducer providing information on vortices existing in the fluid flow.

2. A combination as set forth in claim 1 wherein the pressure sensing planar member is supported by the supporting body by means of at least one bearing disposed coaxially to the torsion axis.

3. A combination as set forth in claim 1 wherein the pressure sensing planar member is supported by the supporting body by means of at least one elongated support member having a slender cross section and disposed coaxially to the torsion axis, wherein said at least one elongated support member structurally connects the pressure sensing planar member to the supporting body in a torsionally elastic arrangement.

4. A combination as set forth in claim 1 wherein the torsion axis is disposed adjacent to an upstream side edge of the pressure sensing planar member, and the pressure sensing planar member includes a planar flow guide disposed upstream thereof generally perpendicular to the pressure sensing planar member and connected thereto.

5. A combination as set forth in claim 1 wherein the torsion axis is disposed adjacent to a downstream side edge of the pressure sensing planar member, and the pressure sensing planar member includes a planar flow guide disposed downstream thereof generally perpendicular to the pressure sensing planar member and connected thereto.

6. A combination as set forth in claim 1 wherein the pressure sensing planar member includes another lateral extension extending therefrom in a direction opposite to said a lateral extension and connected to another transducer at an extremity thereof, whereby electrical signals generated by said a and another transducer can be combined to cancel noise therebetween and obtain a refined signal representing the fluctuating fluid pressure.

7. A combination as set forth in claim 1 wherein the pressure sensing planar member is disposed downstream of a vortex generating bluff body of elongated cylindrical shape disposed across the flow passage in a generally parallel relationship therebetween.

8. A combination as set forth claim 1 wherein the pressure sensing planar member is disposed in a planar cavity included in a vortex generating bluff body of elongated cylindrical shape disposed across the flow passage in a generally parallel relationship therebetween, wherein the lateral extension extends out of the planar cavity, and planar cavity includes openings exposing the two opposite side surfaces of the pressure sensing planar member respectively to fluid pressure at the two opposite sides of the vortex generating bluff body.

9. An apparatus for measuring fluid flow comprising in combination:
   a) a body including a flow passage extending therethrough;
   b) a vortex generating bluff body of elongated cylindrical shape disposed across the flow passage and secured to the body;
   c) a pressure sensing planar member disposed downstream of the vortex generating bluff body generally parallel to the bluff body and to the direction of fluid flow and supported by the body in an arrangement allowing at least a minute amount of pivoting movement of the pressure sensing planar member about a torsion axis disposed generally parallel to the pressure sensing planar member and generally perpendicular to the central axis of the flow passage in an off-set arrangement from the center line of the pressure sensing planar member perpendicular to the central axis of the flow passage;

d) a lateral extension extending from the pressure sensing planar member towards wall of the flow passage in a direction generally perpendicular to the torsion axis as well as to the central axis of the flow passage; and e) a transducer connected to an extremity of the lateral extension for converting an alternating torque about the torsion axis generated by vortices shed from the vortex generating bluff body and experienced by the pressure sensing planar member to a fluctuating electrical signal providing information on flow rate of fluid.

10. A combination as set forth in claim 9 wherein said combination includes means for determining fluid velocity from frequency of said fluctuating electrical signal.

11. A combination as set forth in claim 9 wherein said combination includes means for determining mass flow rate of fluid from a combination of frequency and amplitude of said fluctuating electrical signal.

12. A combination as set forth in claim 11 wherein said combination includes means for determining density of fluid from ratio of the mass flow rate to volume flow rate determined from frequency of said fluctuating electrical signal.

13. A combination as set forth in claim 9 wherein the pressure sensing planar member includes another lateral extension extending therefrom in a direction opposite to said a lateral extension and connected to another transducer, whereby electrical signals generated by said a and another transducer can be combined to cancel noise therebetween and obtain a refined signal representing the vortex shedding from the vortex shedding bluff body.

14. A combination as set forth in claim 9 wherein the torsion axis is disposed adjacent to the leading edge of the pressure sensing planar member, and the pressure sensing planar member includes a planar flow guide disposed upstream thereof generally perpendicular to the pressure sensing planar member and connected thereto.

15. An apparatus for measuring fluid flow comprising in combination:

a) a body including a flow passage extending therethrough;

b) a vortex generating bluff body of elongated cylindrical shape disposed across the flow passage and secured to the body;

c) a pressure sensing planar member disposed within a planar cavity included in the vortex generating bluff body in an arrangement allowing at least a minute amount of pivoting movement of the pressure sensing planar member about a torsion axis disposed generally parallel to the pressure sensing planar member and generally perpendicular to the central axis of the flow passage in an off-set arrangement from the center line of the pressure sensing planar member perpendicular to the central axis of the flow passage, wherein the planar cavity includes openings exposing the two opposite side surfaces of the pressure sensing planar member respectively to fluid pressures at the two opposite sides of the vortex generating bluff body;

d) a lateral extension extending from the pressure sensing planar member and out of the planar cavity towards wall of the flow passage in a direction generally perpendicular to the torsion axis as well as to the central axis of the flow passage; and e) a transducer connected to an extremity of the lateral extension for converting an alternating torque about the torsion axis generated by vortices shed from the vortex generating bluff body and experienced by the pressure sensing planar member to a fluctuating electrical signal providing information on flow rate of fluid.

16. A combination as set forth in claim 15 wherein said combination includes means for determining fluid velocity from frequency of said fluctuating electrical signal.

17. A combination as set forth in claim 15 wherein said combination includes means for determining mass flow rate of fluid from a combination of frequency and amplitude of said fluctuating electrical signal.

18. A combination as set forth in claim 17 wherein said combination includes means for determining density of fluid from ratio of the mass flow to volume flow rate determined from frequency of said fluctuating electrical signal.

19. A combination as set forth in claim 15 wherein the pressure sensing planar member includes another lateral extension extending therefrom and out of the planar cavity in a direction opposite to said a lateral extension and connected to another transducer, whereby electrical signals generated by said a and another transducer can be combined to cancel noise therebetween and obtain a refined signal representing the vortex shedding from the vortex shedding bluff body.

20. A combination as set forth in claim 15 wherein the planar cavity extends to and breaks through the trailing edge of the vortex generating bluff body and the downstream side edge of the pressure sensing planar member extends out of the trailing edge of the bluff body, wherein the torsion axis is disposed adjacent to the downstream side edge of the pressure sensing planar member, and the pressure sensing planar member includes a planar flow guide disposed downstream thereof generally perpendicular to the pressure sensing planar member and connected thereto.

* * * * *